July 1, 1941.  C. E. FRUDDEN ET AL  2,247,367
TRACTOR IMPLEMENT
Filed July 1, 1939  4 Sheets-Sheet 1

Inventors
C. E. Frudden
W. H. Funke
A. G. Buhr
by  Attorney

Fig. 4

Patented July 1, 1941

2,247,367

UNITED STATES PATENT OFFICE 2,247,367

TRACTOR IMPLEMENT

Conrad E. Frudden, Wauwatosa, and Willard H. Tanke and August G. Buhr, La Crosse, Wis., assignors to Allis-Chalmers Manufacturing Company, Milwaukee, Wis., a corporation of Delaware Application July 1, 1939, Serial No. 282,336

19 Claims. (Cl. 97—47)

The invention relates to self-propelled implements for farm use and the like, in which a tractor and a tool carrying attachment are combined to function as a unitary power operated implement.

Implements of the mentioned character have heretofore been designed with a view to lessening the time and effort required for installing the attachment on the tractor and removing it therefrom, so that the tractor may readily be made available for work either with or without the attachment, and for that purpose constructions have heretofore been developed which permit installation of the attachment as a unitary structure on the tractor, and its removal as a unitary structure from the tractor, without requiring disassembly of the tractor. Such unitary prior art attachments have been used preferably in connection with the tricycle type of farm tractor.

It is an object of the invention to provide an implement attachment for tractors constructed in a novel manner to accomplish substantially the desirable results of the mentioned prior art attachments but which lends itself for use in connection with a four wheel tractor and which attachment preferably includes track eradicating tools adapted to loosen the soil which has been packed by the tractor wheels. In order to accomplish this object the invention contemplates an attachment constructed in the form of a vertically foldable unit which is to be installed on the tractor by first setting it up on the ground in folded condition, then driving the tractor over the folded unit, and then moving a portion of the foldable unit upwardly for fastening it to the tractor body. Said upward movement of the mentioned portion of the unit may be accomplished either by lifting the unit in folded condition, or by unfolding the unit, or by a combination of both of these operations. On the other hand, in order to remove the unit from the tractor, the mentioned portion of the foldable unit is detached from the tractor body and lowered to afford clearance for driving the tractor away from the unit. Said lowering movement of the mentioned portion of the unit, like its upward movement, may be accomplished in several ways, that is, the unit may be adjusted to its folded condition prior to the detachment of the mentioned portion from the tractor body and lowered, in folded condition, after said detachment, or the mentioned portion of the unit may be detached while the unit is in unfolded condition, or in partially unfolded condition, and then be lowered by folding adjustment of the unit.

The foldable unit of the attachment according to the invention includes a base affording a support for ground engaging tools, and the length of said base is preferably such as to provide for the mounting of tools forwardly and rearwardly of a vertical plane through the axis of the rear wheels of the tractor. The mentioned track eradicating tools are preferably mounted on rearward lateral extensions of the base projecting over the tread lines of the rear tractor wheels, and in order to permit the tractor to move into and out of an attaching position over the folded unit without interference of the wheels with said lateral extensions, the attachment, in its preferred form, is so constructed that the tractor may be backed over the folded unit and driven away from it in a forward direction. During such backward and forward movements of the tractor the folded unit will be cleared by the rear axle structure of the tractor, and in order to provide for such clearance the invention contemplates removal of the forward ground engaging tools from the base, and detachment of the handle end of an adjusting lever mounted on the foldable unit. It should be understood, however, that it is not intended to limit the invention to a construction of the foldable unit which depends for said mentioned clearance on the removal of the forward ground engaging tools and on the detachment of the handle end of the adjusting lever, since the foldable unit may be constructed to provide for said clearance without resort to the mentioned specific features of the invention.

Another object of the invention is to provide an improved tractor propelled farm implement for working relatively spaced strips of soil at opposite sides of a plant row extending centrally between the tread lines of axially spaced rear wheels of the tractor, the improvement consisting in a novel construction of the implement which enables the driver of the tractor to observe said plant row at close range from a seat at the rear of the tractor without making it necessary for him to take an uncomfortable position on his seat, as by leaning over to one side or the other.

A further object of the invention is to provide an improved implement attachment for tractors which is relatively simple and compact in construction, efficient in operation, and which may be manufactured at relatively low costs.

These and other objects and advantages of the invention will be apparent from the following description of a preferred embodiment of the invention. Referring to the drawings accompanying and forming part of this specification, and in which like reference characters designate the same or similar parts in the various views:

Figures 1, 5:
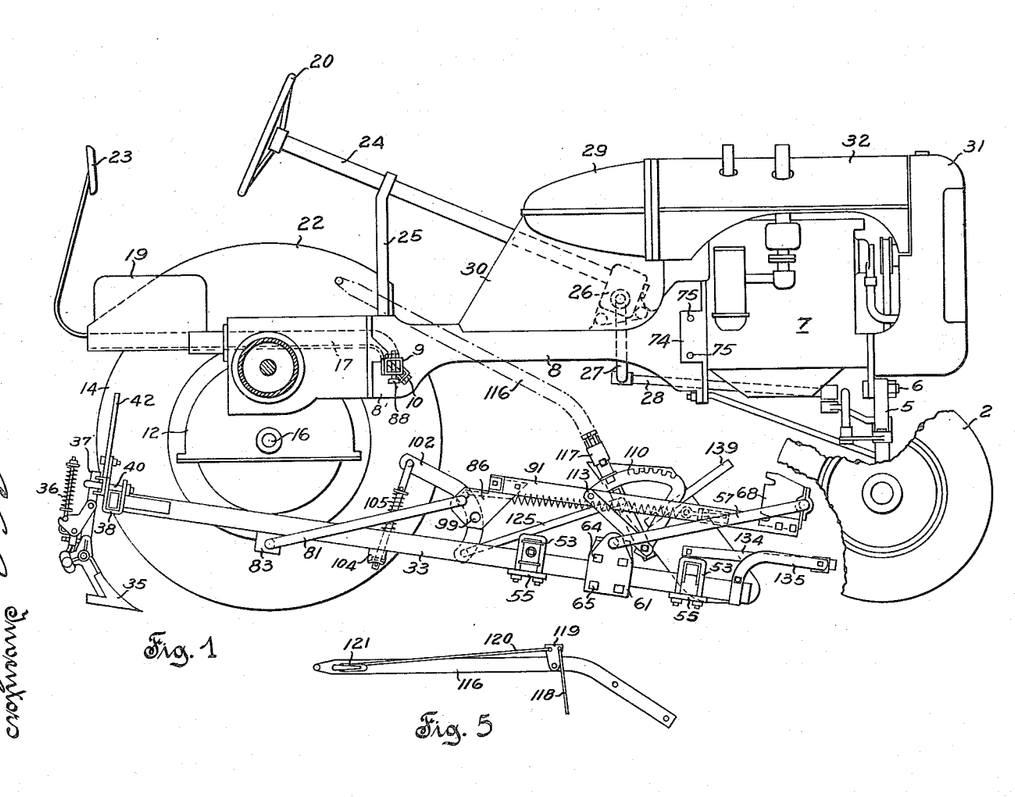
Fig. 1 is a side view of a four wheel tractor and of an implement attachment therefor, the near rear wheel of the tractor being omitted and the near front wheel being partly broken away for purposes of disclosure, and the implement attachment being shown in folded position preparatory to installation on the tractor.
Fig. 5 is a detail view of the handle end of an operating lever for the attachment shown in Figs. 1 to 4.
Figure 3:
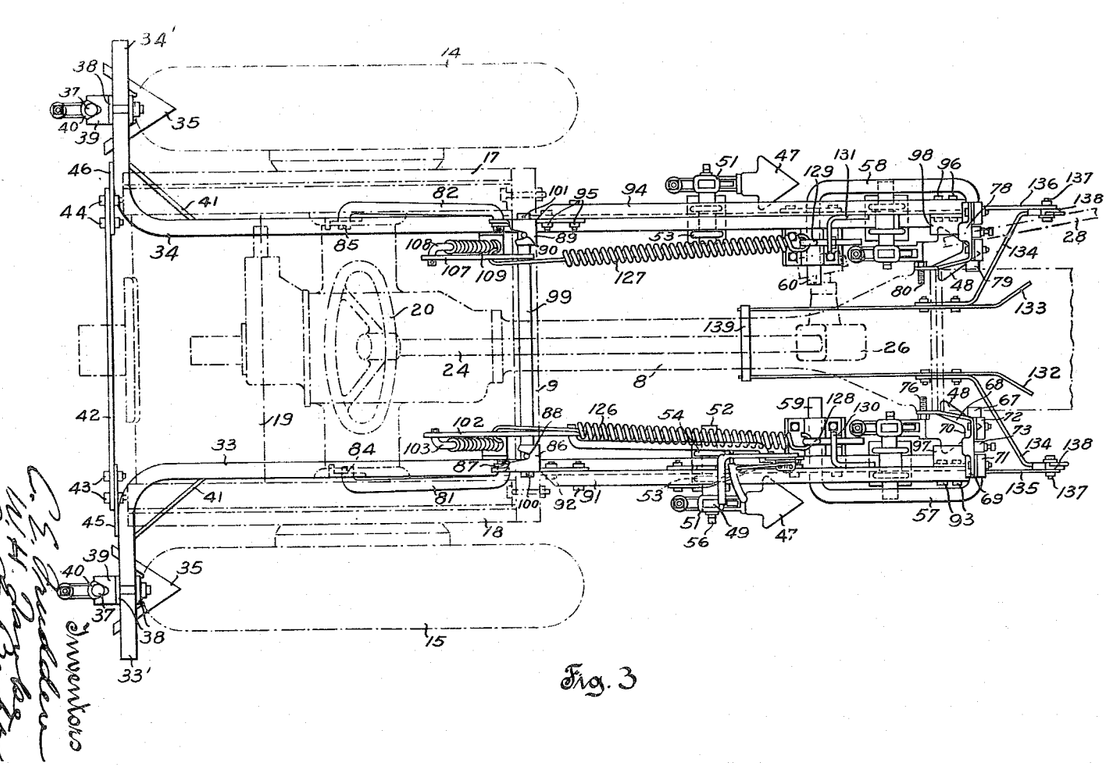
Fig. 3 is a top view of the tractor and implement attachment shown in Fig. 2.
Figure 4:
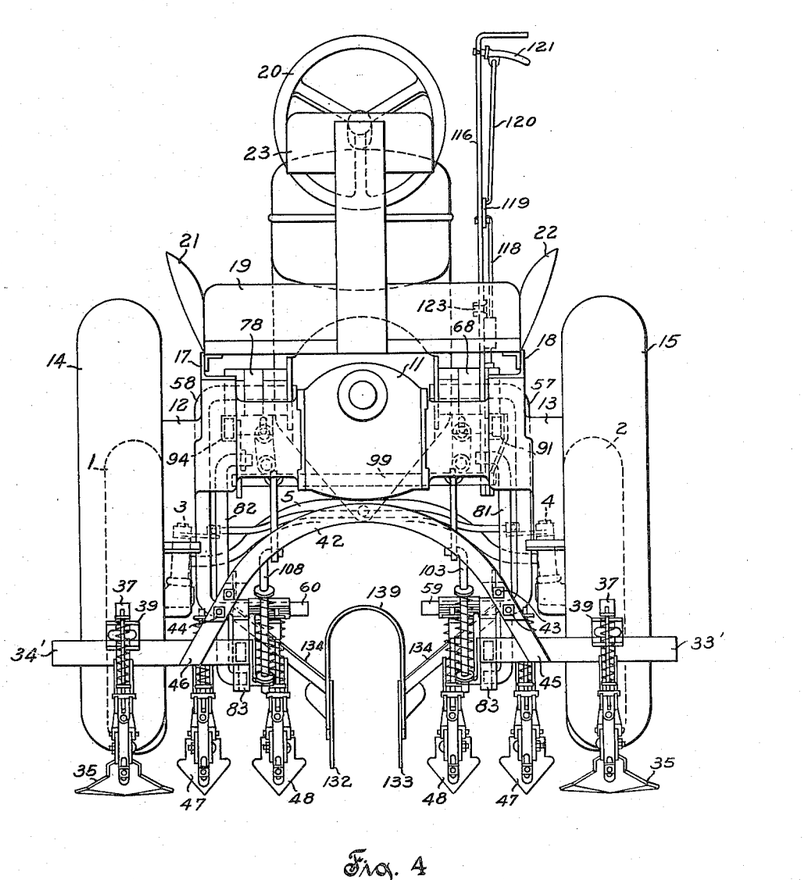
Fig. 4 is a rear view of the tractor and implement attachment shown in Fig. 2.

Referring to Figs. 1 and 4, axially spaced front wheels 1 and 2 of the tractor, equipped with pneumatic tires, are mounted on steering knuckles 3 and 4 at opposite ends of an upwardly arched front axle 5 which is rockably mounted at 6 on the forward end of a motor unit 7. Secured to the rear end of the motor unit 7 is a torque tube casing 8 which has a bell shaped forward end enclosing the usual flywheel and clutch mechanism of the tractor, the portion of the torque tube casing rearwardly of the bell housing forming a relatively narrow elongated tube, as may be seen from Figures 1 and 3. The rear end of the torque tube casing 8 has a downward extension 8' on which a tubular crossbar 9 is mounted and held in place by means of bolts 10. The torque tube casing 8 is supported at its rear end on an upwardly arched rear axle structure comprising a differential casing 11 and L-shaped side casings 12 and 13 which are secured to opposite sides of the differential casing 11 and enclose final drive mechanisms at opposite sides of the tractor. The arched rear axle structure is supported on rear driving wheels 14 and 15 having pneumatic tires and mounted on the depending portions of the side casings 12 and 13, respectively, the axle of the rear wheel 14 being indicated at 16 in Fig. 1, and the rear wheel 15 being mounted on the side casing 13 in axial alinement with the rear wheel 14. Provisions are made for varying the tread width of the rear wheels 14 and 15, that is, the transverse spacing of the tread lines of said wheels, and for that purpose the tire rims of the wheels 14 and 15 are reversibly mounted on the wheel bodies. The ground clearance between the rear wheels 14 and 15 afforded by the arched rear axle structure is substantially of the same height as the ground clearance afforded by the arched front axle structure so that a plant row extending longitudinally of the tractor centrally between the wheels may be cleared by the tractor. Mounted on the rear end of the tractor is a frame structure comprising transversely spaced side beams 17 and 18 which are bent downwardly at their forward ends for connection with the transverse tubular crossbar 9. A wide seat cushion 19 is mounted between the side beams 17 and 18 on which a driver may take a position behind the steering wheel 20, and when so seated the driver may straddle the portion of the tractor forwardly of the rear axle structure with his legs and rest his feet on the tubular crossbar 9. The frame on the rear end of the tractor, including the side beams 17 and 18, also carries stub fenders 21 and 22, and a back rest 23. The steering wheel 20 is mounted at the rear end of a steering column 24 which is mounted on a post 25, and in a steering gear casing 26 secured to the torque tube casing 8 rearwardly of the bell housing. The steering gear casing 26 encloses a worm and gear mechanism operable by the hand wheel 20 to transmit steering movement to the front wheels by suitable mechanism including a steering arm 27 and a drag link 28 connected at its forward end with the left steering knuckle 3. A rearwardly tapered fuel tank 29 is mounted in an elevated position above the torque tube casing 8, and a transversely narrow sheet metal structure 30 extends between the fuel tank 29 and the upper side of the torque tube casing 8. A radiator and radiator shell 31 are mounted on the forward end of the motor unit 7 and a hood 32 extends between the fuel tank 29 and the radiator shell 31 above the motor unit 7.

Features of the tractor herein disclosed are claimed in a copending application Serial No. 274,164, filed May 17, 1939, C. E. Frudden and W. F. Strehlow, Tractor, and for a fuller disclosure of the tractor, reference is here made to said copending application.

Figures 2, 6:
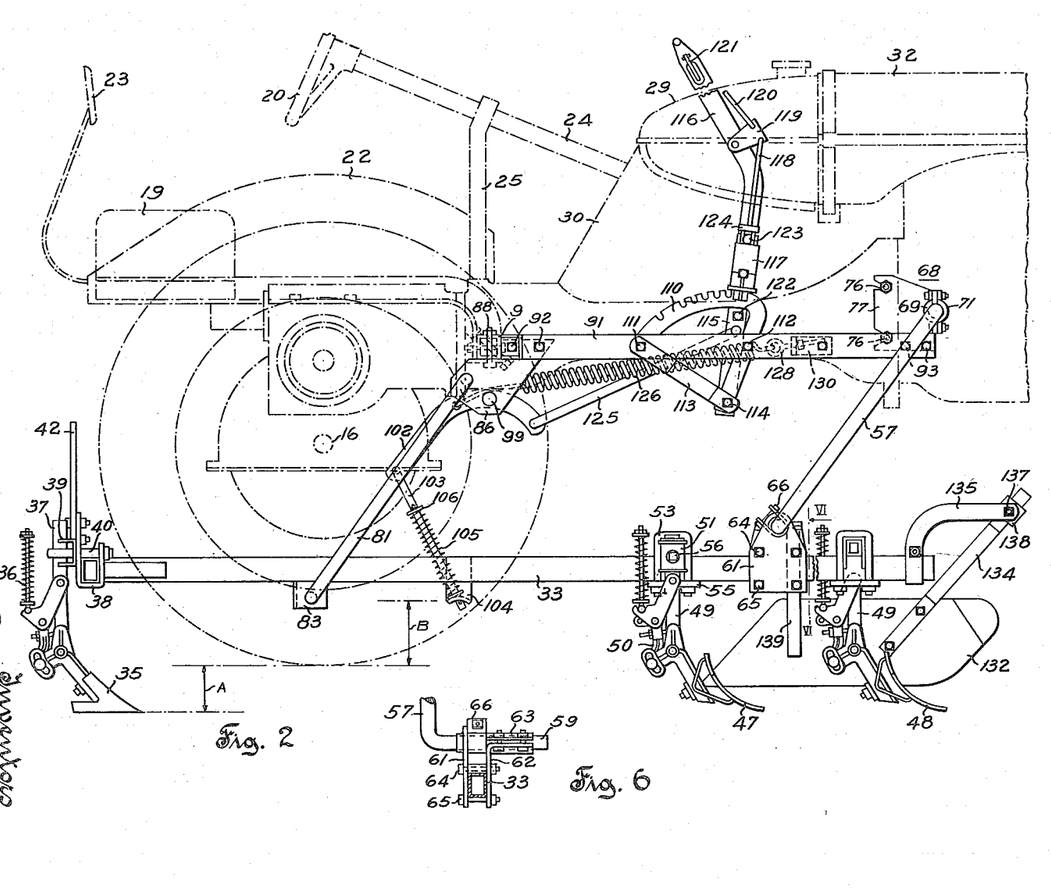
Fig. 2 is a view similar to Fig. 1, on an enlarged scale, the front end of the tractor being omitted and the attachment being shown in working position on the tractor.
Fig. 6 is an enlarged detail view on line VI—VI of Fig. 2.

Mounted on the tractor, as shown in Figs. 2, 3 and 4, is a cultivator attachment which is constructed in the following manner. A pair of beams 33 and 34 extend below the axis of rotation of the rear wheels 14 and 15 transversely of a vertical plane through said axis and constitute a base for the mounting of ground engaging tools forwardly and rearwardly of said plane. The beams 33 and 34 have transversely extending end portions 33' and 34', formed by bending the beams into L-shape, and the shorter legs of the L-shaped beams project over the tracks of the rear wheels 15 and 14, respectively. Track eradicating tools are mounted on the transverse end portions of the beams in position to loosen the soil which has been packed by the right front and rear wheels 2 and 15 and by the left front and rear wheels 1 and 14, respectively, the front and rear wheels at opposite sides of the tractor being arranged in tracking relation as may be seen from Fig. 4. Each of the track eradicating tools comprises a shovel 35 which is mounted by means of a suitable spring trip mechanism 36 on a standard 37. A supporting bracket for the standard 37 comprises a U-shaped bracket 38 to which a clip 39 is secured in position to afford a seat for the standard 37. An eyebolt 40 embracing the standard 37 extends through upwardly projecting ends of the bracket 38 and a nut on the eyebolt may be tightened to pull the standard 37 against the clip 39 to secure the standard in fixed position on the bracket 38. The transverse end portions 33' and 34' extend through the brackets 38 behind the rear wheels 14 and 15, respectively, and it will be seen that tightening of the nut on the eyebolt 40 will not only pull the standard 37 against the bracket 38, but will also clamp this bracket securely upon the respective end portion 33' or 34'. On the other hand, if it is desired to adjust the brackets 38 longitudinally of the transverse end portions of the beams on which they are mounted, as will be necessary when the tread width of the rear tractor wheels is changed, it is only necessary to loosen the nuts on the eyebolts 40 whereupon the brackets 38 and shovels 35 may be slid longitudinally of the end portions 33' and 34', respectively, to any desired position. The transverse end portions 33' and 34' are braced against the longitudinal portions of the beams 33 and 34 by straps 41 which are welded in position, and a spreader arch 42 is secured to the rear ends of the beams 33 and 34 to fix the transverse spacing of the beams. The spreader arch 42 is secured by means of bolts 43 and 44 to straps 45 and 46 which are welded, respectively, to the transverse end portions 33' and 34' of the beams.

Mounted on the long legs of the L-shaped beams 33 and 34 are cultivating tools positioned to work on opposite sides of a plant row extending longitudinally of the tractor centrally between the front and rear wheels. As shown in Fig. 3, each beam carries two forward cultivating tools including shovels 47 and 48, one at the inside of the beam and one at the outer side of the beam, mounting elements of identical construction being used for all of the shovels in order to secure them to the beams, and it will therefore be sufficient to explain the mounting of one of these tools. Referring to the mounting of the outer shovel 47 on the beam 33, it will be seen that the shovel is mounted on a standard 49 by means of a spring trip mechanism 50 which is similar to the spring trip mechanism 36 of the track eradicating shovels 35 and of conventional design which is believed to require no further explanation. The standard 49 extends through a socket 51 at the end of a square bar 52 which extends over the beam 33 and is held in position thereon by a pair of U-bolts 53 and 54 cooperating with a plate 55 at the underside of the beam 33 to secure the bar 52 in position on the beam 33. The bar 52, U-bolts 53 and 54, and plate 55 may be moved longitudinally of the beam 33 to any adjusted position, and the bar 52 may be moved transversely of the beam 33 to any desired position before tightening the nuts on the U-bolts 53 and 54. The standard 49 is held in position in the socket 51 by means of a set screw 56 which, after loosening, permits vertical adjustment of the standard 49 within the socket 51. In order to position the cultivating shovel at the inner side of the beam, as shown in connection with the shovel 48, the position of the bar 52 on the beam 33 is reversed and also the position of the standard 49 within the socket 51.

Mounted on the beams 33 and 34 is a vertically collapsible superstructure for mounting the attachment on the tractor, the superstructure being constructed in the following manner. A pair of forward links 57 and 58 are pivotally connected at their lower ends with brackets on the beams 33 and 34, respectively, the construction of one of these brackets being more clearly shown in Fig. 6. As shown in Fig. 6, the link 57 has a relatively long inwardly extending journal portion 59 which extends through a side plate 61 at the outer side of the beam 33, the side plate 61 having an extruded portion to provide a bearing for the journal portion 59. At the inner side of the beam 33 an L-shaped bracket 62 has an upper horizontal bearing portion cooperating with a bearing cap 63 to provide a journal bearing for the inner end of the journal portion 59. The outer plate 61 and the L-shaped bracket 62 are connected by bolts 64 and 65 which are tightened to hold the plate and bracket in fixed position on the beam 33, and a collar 66 is clamped around the journal portion 59 between the plate 61 and the bracket 62 to prevent axial displacement of the journal portion 59. The entire assembly comprising the side plate 61 and bracket 62 may be adjusted longitudinally of the beam 33 after loosening the nuts on the bolts 64 and 65.

The forward link 58 has a relatively long inward journal portion 60 which is pivotally connected with the beam 34 in the same manner as has just been described in connection with the journal portion 59 of the link 57, the bearing assembly connecting the lower end of link 58 with the beam 34 being likewise adjustable longitudinally of the beam 34.

The upper end of the link 57 is bent inwardly to form a relatively long journal portion 67 which is pivotally mounted in an L-shaped bracket 68. The main body of this bracket is die-forged from a sheet metal blank and has a transverse wing portion provided with a pair of semicylindrical recesses 69 and 70 which cooperate with bearing caps 71 and 72 to provide axially alined bearings for the journal 67. A set collar 73 is mounted on the journal 67 between the bearings of the bracket 68 to prevent axial displacement of the journal 67, the transverse wing portion of the bracket 68 being suitably recessed to accommodate the collar 73. The bracket 68 is mounted on the side of the bell housing of the torque tube casing 8, the bell housing having a mounting pad 74 integrally formed therewith and provided with threaded holes 75 for the reception of bolts 76. A longitudianl wing portion 77 of the bracket 68 has rearwardly open notches for rearward sliding movement of the bracket 68 upon the bolts 76, these bolts being tightened to hold the bracket 68 securely in position on the tractor.

A bracket 78 similar to the bracket 68 is secured to the tractor at the other side to provide a journal bearing for a relatively long journal portion 79 at the upper end of the link 58. The construction of the bracket 78 and its connection with the tractor and with the journal portion 79 corresponds to the construction of the bracket 68 and its connection with the tractor and with the journal portion 67. A mounting pad corresponding to the mounting pad 74 is formed integrally with the bell housing of the torque tube casing 8 at the other side of the tractor for mounting the bracket 78 thereon and bolts 80 corresponding to the bolts 76 are screwed into the mounting pad at the other side of the bell housing to secure the bracket 78 in fixed position on the tractor.

It will be seen that the journal portions 59 and 67 of the link 57 and the bearings cooperating therewith provide for substantial stabilization of the beam 33 against transverse tilting and horizontal displacement laterally of the tractor, and permit up and down movement of the beam relative to the tractor in a vertical plane. The beam 34 is similarly stabilized by the link 58 and the pivotal connections of the latter with the beam 34 and with the tractor.

The links 57 and 58 and their mountings on the tractor form part of the superstructure which has been mentioned hereinbefore. The superstructure further includes a pair of rearward links 81 and 82, the right link 81 having a lower inwardly bent end pivotally mounted in a clip 83 at the underside of the beam 33. The left link 82 is similarly mounted for pivotal movement in a clip at the under side of the beam 34. Cotter pins 84 and 85 on the links 81 and 82, respectively, prevent separation of the links from their respective mounting clips on the beams 33 and 34.

The upper end of the link 81 is bent inwardly and pivotally mounted on a sheet metal bracket 86 which has a vertical wing portion with a hole in it for the reception of the inwardly bent portion at the upper end of the link 86, the latter being held in place by a cotter pin 87. The bracket 86 also has a horizontal wing portion extending under the tubular crossbar 9 of the tractor and is held in place thereon by a bolt 88. A notch in the horizontal wing portion of the bracket 86 for the reception of the bolt 88 opens rearwardly, as shown in Fig. 3, to permit forward separation of the bracket from the crossbar after loosening of the nut on the bolt 88.

A bracket 89 corresponding to the bracket 86 is secured to the other end of the crossbar 9 by means of a bolt 90, and the upper end of the link 82 is bent inwardly and pivotally mounted on the bracket 89 in the same manner as the link 81 is mounted on the bracket 86.

A square tubular beam 91 extends between the brackets 86 and 68, the beam being secured at its rear end to the bracket 86 by bolts 92. An angle iron clip 97 having a horizontal upper flange and a depending lateral flange is welded to the rear face of the lateral wing portion of the bracket 68, and bolts 93 at the forward end of the beam 91 secure the beam 91 to the depending flange of the clip 97. A square tubular beam 94 corresponding to the square tubular beam 91 extends between the brackets 89 and 78 at the other side of the tractor, and the beam 94 is connected at its rearward end to the bracket 89 by means of bolts 95. The forward end of the tubular beam 94 is secured by bolts 96 to an angle iron clip 98 welded to the rear face of the transverse wing of the bracket 78, this arrangement corresponding to the forward connection between the tubular beam 91 and the bracket 68. It will be seen that the described mounting of the beams 91 and 94 places these beams at a substantial distance laterally from the torque tube casing 8 of the tractor.

A rock shaft 99 is mounted at its opposite ends in the vertical portions of the brackets 86 and 89 in position to extend transversely below the tractor body. Cotter pins 100 and 101 at opposite ends of the rock shaft cooperate with the bracket 86 and 89 to prevent axial displacement of the rock shaft. A bell crank lever 102 secured on the rock shaft in proximity to the bracket 86 has a rearwardly extending arm which is pivotally connected at its outer end with the upper end of a rod 103, the lower end of said rod being connected with the beam 33 for transmitting upward pull and downward push thereto. A clip 104 secured to the beam 33 has a curved flange laterally of the beam 33, and the rod 103 extends through an opening of the curved flange of the clip 104 and has a cotter pin below said flange to prevent upward separation of the rod 103 from the clip 104. A coil spring 105 surrounding the rod 103 bears at its lower end upon a washer contacting the curved flange of the clip 104, the upper end of the coil spring bearing against a stop on the rod 103 in the form of a washer 106 retained by a cotter pin within the rod 103. The coil spring 105 is under precompression and permits resilient upward movement of the beam 33 relative to the rod 103. An arm 107 corresponding to the rearwardly extending arm of the bell crank lever 102 is secured to the rock shaft 99 in proximity to the bracket 89, and the free end of the arm 107 is connected with the beam 34 for transmitting upward pull and downward push thereto in the same manner as the bell crank lever 102 is connected with the beam 33, that is, by means of a connection including a rod 108 and a coil spring 109 corresponding to the rod 103 and coil spring 105.

Mounted on the square tubular beam 91 at the right side of the tractor, in the space between the brackets 86 and 68, is a quadrant 110 which is secured to the inner side of the beam 91 by means of bolts 111 and 112. The quadrant has a forward leg extending downwardly below the beam 91, and the lower end of the leg is braced against the beam 91 by a strap 113 secured at its lower end to the leg by a bolt 114 and at the upper end to the outer side of the beam 91 by the bolt 111. A two-part operating lever comprising a lower section 115 and a handle end 116 is pivoted on the leg of the quadrant 110 by means of the bolt 114. A latch box 117 is secured to the upper end of the lower section 115 of the operating lever and encloses two latch dogs cooperating with a notched portion of the quadrant 110 to retain the operating lever in any one of a plurality of adjusted positions about the pivot axis of the operating lever at 114. Linkage comprising an operating rod 118, a rocker 119 and a rod 120, is mounted on the operating lever for actuating the latch dogs in the latch box 117, the upper end of the rod 120 being connected with a latch lever 121 below the handle of the upper section 116 of the operating lever. The upper section 116 of the operating lever is detachably secured to the lower section 115 by means of a pair of bolts 122 and 123, the lower portion of the upper section 116 overlapping the upper portion of the lower section 115, and the bolts 122 and 123 passing through registering holes in the upper and lower sections. The bolt 123 has a countersunk head in the upper portion of the lever section 115 and a nut at the inner side of the section 116, as shown in Fig. 4. By removing the nut from the bolt 123 and the nut from the bolt 122, the handle end 116 of the operating lever may be disconnected from the lower section 115. The rod 118 is hook-connected at its lower end with a bridge portion 124 to which the latch dogs are secured, the hook-connection between the rod 118 and the bridge portion 124 permitting universal movement of the handle end 116 after its detachment from the lower section 115. In order to remove the handle end 116 entirely from the attachment, the operating rod 118 may be disconnected from the rocker 119. The lower section 115 of the operating lever is connected with a forwardly extending arm of the bell crank lever 102 by means of a link 125, and it will be seen that rocking movement of the operating lever 115, 116 will transmit push and pull to the link 125 and cause corresponding rocking movement of the rock shaft 99.

In Fig. 2 the operating lever 115, 116 is shown locked in its extreme forward position, and upon release of the latch mechanism by upward pull on the latch lever 121 the operator of the tractor may swing the operating lever rearwardly about the pivot bolt 114. Such rearward movement of the operating lever is transmitted to the rock shaft 99 through the link 125 and causes upward pull on both beams 33 and 34 through the rods 103 and 108, the rock shaft rotating in a clockwise direction, with reference to Fig. 2, in the brackets 86 and 89. Due to the guiding action of the links 57 and 81 upward pull on rod 103 will cause translatory movement of the beam 33 in an upward and rearward direction, substantially parallel with the ground, and upward pull on rod 108 will likewise cause translatory movement of the beam 34 in an upward and rearward direction substantially parallel with the ground due to the guiding action of the links 58 and 82. The upper beam 91 with the brackets 68 and 86 mounted thereon, the links 57 and 81, and the lower beam 33 cooperate to form a jointed parallelogram structure, the distance between the upper and lower journals of the link 57 being equal to the distance between the upper and lower journals of the link 81. Likewise, the upper beam 94 with the brackets 78 and 89 mounted thereon, the links 58 and 82, and the lower beam 34 cooperate to form a jointed parallelogram structure, the distance between the upper and lower journals of the link 58 being equal to the distance between the upper and lower journals of the link 82. The mentioned two parallelogram structures are dimensioned alike and mounted on the tractor in like positions so that they will be operated in unison by actuation of the operating lever 115, 116. A true parallel motion of the beams 33 and 34 relative to the ground will be obtained if the bearing assembly which connects the lower end of the link 57 with the beam 33 is adjusted, longitudinally of the beam, to such a distance from the clip 83 that the spacing between the pivot axes of the links 57 and 81 on the beam 33 is precisely equal to the spacing between the pivot axes of said links on the upper beam 91, and if the bearing assembly which connects the lower end of the link 58 with the beam 34 is adjusted, longitudinally of said beam, to such a distance from the pivot clip for the link 82 on the beam 34 that the spacing between the pivot axes of the links 58 and 82 on the beam 34 is precisely equal to the spacing between the pivot axes of said links on the upper beam 94. Fig. 2 shows the bearing assembly for the lower end of the link 57 adjusted to the mentioned distance from the clip 83 which affords true parallel motion of the beam 33, and it should be understood that the bearing assembly for the lower end of the link 58 is likewise adjusted to afford true parallel motion of the beam 34. Fig. 2 also shows the cultivating shovels 47 and 48 and the track eradicating shovel 35 adjusted on the beam 33 to such positions that they penetrate the soil to a substantial depth, indicated by the double headed arrow A, while the operating lever 115, 116 occupies its extreme forward position, and the cultivating and track eradicating shovels on beam 34 are positioned to penetrate the soil to the same depth as the cultivating and track eradicating shovels on beam 33. The depth of soil penetration of the cultivating and track eradicating shovels of both beams may conveniently be regulated collectively by adjustment of the operating lever 115, 119 on the quadrant 110.

In order to lift the cultivating and track eradicating shovels out of the ground the operating lever 115, 116 is moved backward to its rearmost position, the notch in the quadrant 110 next to the bolt 111 serving to lock the operating lever in said position. The rearward and upward swinging of the beams 33 and 34, parallel to the ground effected by adjustment of the operating lever 115, 116 to its rearmost position, results in a simultaneous raising movement of all cultivating and track eradicating shovels, and the vertical component of such raising movement is sufficient to elevate the shovels a substantial distance above the ground. With the mentioned setting of the cultivating and track eradicating shovels on the beams 33 and 34, which places the tips of all shovels into a common horizontal plane, the cultivating shovels are elevated to the same height above the ground as the track eradicating shovels when the operating lever is adjusted to its rearmost position, said height being indicated in Fig. 2 by the double headed arrow B. In order to assist the operator in raising the beams 33 and 34, balancing springs 126 and 127 are anchored at their rear ends on the bell crank lever 102 and on the arm 107, respectively, of the rock shaft 99, the forward ends of the balancing springs being hooked into eyebolts 128 and 129, respectively, adjustably mounted on angle clips 130 and 131 secured to the inner sides of the beams 91 and 94, respectively.

When operating the machine in the field, it is sometimes desirable to have the cultivator shovels run deeper or shallower than the track eradicating shovels. This result may be accomplished, according to the invention, without disturbing the setting of the tools on the beams 33 and 34, by a slight forward or rearward adjustment of the bearing assemblies which connect the lower ends of the links 57 and 58 with the beams 33 and 34, respectively. Rearward adjustment of said bearing assemblies on the beams 33 and 34 results in an upward tilting of the forward portions of the beams about the lower pivots of the links 81 and 82, and due to such upward tilting the cultivating shovels on the forward portions of the beams will run shallower than the rearward track eradicating shovels which in turn are moved by said tilting of the beams to a slightly greater depth of soil penetration. On the other hand, forward adjustment of the mentioned bearing assemblies results in a downward tilting of the forward portion of the beams 33 and 34 about the lower pivots of the links 81 and 82, and due to such downward tilting the cultivating shovels will run deeper than the track eradicating shovels which in turn are moved by said downward tilting of the beams to a slightly shallower depth of soil penetration. Forward or rearward adjustment of the bearing assemblies affects the parallelism of the links 57 and 81 and the parallelism of the links 58 and 82, and causes the beams 33 and 34 to deviate from a true parallel motion relative to the ground when they are moved up or down by manipulation of the operating lever 115, 116. However, for practical purposes a relatively small degree of tilting of the beams is sufficient to make the cultivator shovels run deeper or shallower to the desired extent. While the beams deviate from a true parallel motion relative to the ground due to the adjustment of the bearing assemblies to effect such small degree of tilting of the beams, such deviation from a true parallel motion will not prevent the cultivating shovels and track eradicating shovels from being raised above the ground simultaneously by movement of the operating lever 115, 116 into its extreme rearward position.

Plant shields 132 and 133 are positioned inside of the cultivating shovels on the beams 33 and 34, each plant shield having an outwardly and upwardly extending arm 134 for connection with L-shaped brackets 135 and 136, respectively, on the beams 33 and 34. A pair of relatively cooperating serrated washers 138 is inserted between the bracket 135 and the arm 134 of the plant shield 132, and a bolt 137 extending through the bracket 135 and through the serrated washers 138 and the arm 134, has a nut which may be tightened to prevent rotary movement of the arm 134 relative to the bracket 135 about the bolt 137. The arm 134 of the plant shield 133 is connected with the bracket 136 in a similar manner by means of a bolt 137 and serrated washers 138, and it will be seen that when the nuts on the bolts 137 are tightened, the plant shields 132 and 133 are held in a fixed position relative to the beams 33 and 34. A spreader arch 139 is secured to the plant shields 132 and 133 rearwardly of the arms 134 to fix the transverse spacing of the plant shields.

In operation, the cultivator attachment is mounted on the tractor as shown in Fig. 2, and the operating lever 115, 116 is adjusted to a position affording the desired depth of soil penetration of the cultivating shovels 47 and 48 and of the track eradicating shovels 35. It will be seen that a driver occupying a position on the seat 19 substantially directly behind the steering wheel 20 may observe a plant row between the beams 33 and 34 by looking down along the torque tube casing 8 through the space between said casing and the upper beam 91 at the right side of the tractor or through the space between the torque tube casing 8 and the upper beam 94 at the left side of the tractor. In order to have a good view of the plant row it is not necessary for the driver to lean over uncomfortably to one side or the other, since the portion of the torque tube casing rearwardly of the bell housing occupies only a relatively small space transversely of the tractor and the open framework of the attachment does not substantially obstruct the driver's vision.

In order to remove the attachment from the tractor and make the tractor available for other work, only a few and relatively simple operations are to be performed as follows. The beams 33 and 34 are raised to an elevated position above the ground by manipulation of the lever 115, 116 and the forward cultivating shovels are removed from the beams 33 and 34 by first loosening the set screws 56 of the sockets 51 and then withdrawing the standards 49 from the sockets. The bolts 76 and 80 on the bell housing of the torque tube casing 8 are loosened and also the nuts on the bolts 88 and 90 which secure the rearward brackets 86 and 89 to the transverse crossbar 9. The attachment may then be moved slightly forwardly in order to disengage the brackets 68 and 78 from the bolts 76 and 80, such forward movement also disengaging the brackets 86 and 89 from the bolts 88 and 90. After the mentioned disengagement of the brackets the attachment may then be lowered upon the ground into the position in which it is shown in Fig. 1. After removal of the shovels 47 and 48, and prior to the disengagement of the brackets on the upper beams 91 and 94 from the tractor the operating lever 115, 116 may be manipulated to unfold the attachment so that upon disengagement of the attachment from the tractor the attachment will come to rest on the ground after a comparatively short drop. While the forward ends of the beams 33 and 34 and the rear tools rest on the ground, as indicated in Fig. 1, the operating lever may then be manipulated to adjust the attachment to its folded condition as shown in Fig. 1. After disconnection of the attachment from the tractor and its collapse the handle end 116 is disconnected from the lower section 115 of the operating lever and placed alongside the beam 33 so as to be out of the way and permit forward movement of the tractor away from the attachment. If desired, the rod 118 of the handle end may be detached from the rocker 119 and the handle section may be entirely removed from the attachment. The plant shields 132 and 133 are permitted to move into the position in which they are shown in Fig. 1 by loosening the nuts on the bolts 137. It will be seen that after the attachment has been placed into the position in which it is shown in Fig. 1 the tractor may be driven forwardly away from the attachment and during such movement the arched rear axle structure will easily clear the collapsed superstructure comprising the upper beams 91, 94, brackets 68, 86, 78, 89, the forward links 57, 58 and the rearward links 81, 82, and it is not necessary to remove the lift or control mechanism from the superstructure, only the handle end 116 having to be moved out of the way, as stated.

In order to install the attachment on the tractor, the procedure described hereinabove in connection with the removal of the attachment is reversed. That is, the attachment is first set up on the ground in collapsed position as shown in Fig. 1 with the handle end 116 moved out of the way, and the tractor is then backed over the attachment into a position as shown in Fig. 1. The handle section 116 is then secured to the section 115 by means of the bolts 122 and 123, and the operating lever may then be manipulated to unfold the attachment in order to move the upper beams 91 and 94 into an elevated position for ready connection of the brackets 86 and 89 with the bolts 89 and 90 on the crossbar 9. The operator may then take hold of the attachment at its forward end and lift it a short distance to bring the slotted openings of the brackets 68 and 78 into registry with the bolts 76 and 80 on the bell housing of the torque tube casing 8, and by a slight rearward movement of the attachment the rearward brackets 86 and 89 and the forward brackets 68 and 78 will slide into engagement with the bolts 88 and 90 on the crossbar 9, and with the bolts 76 and 80 on the torque tube casing 8. It is not necessary to lift the whole attachment in collapsed condition, but since in the present case the entire weight of the attachment is relatively light, it may also be lifted in collapsed condition in order to connect the brackets 86 and 89 with the bolts 88 and 90, and the brackets 68 and 78 with the bolts 76 and 80. After the nuts on the bolts 88 and 90 and the bolts 76 and 80 have been tightened to secure the upper part or support of the collapsible superstructure on the tractor, the front cultivating shovels may be conveniently mounted in the sockets 51 while the beams 33 and 34 occupy an elevated position above the ground, the operating lever being adjusted to a position to hold the beams in such elevated position. After the attachment has been secured to the tractor, the plant shields may be swung into the position in which they are shown in Fig. 2, and by tightening the nuts on the bolts 137, the plant shields will be secured in said position.

While in the foregoing a preferred embodiment of the invention has been disclosed, it should be understood that it is not intended to limit the invention to the exact details of construction herein shown and described, for various modifications within the scope of the appended claims may occur to persons skilled in the art.

It is claimed and desired to secure by Letters Patent:

1. In an agricultural implement, the combination with a tractor having a body and means including a pair of axially spaced wheels for sustaining said body, of an attachment comprising a base extending within the tread lines of said wheels below the axis thereof transversely of a vertical plane through said axis; said base having a portion, at one side of said plane, underlying said body, and another portion, at the other side of said plane, extending beyond the peripheries of said wheels; and a vertically collapsible superstructure mounted on said base including a support detachably secured to said tractor body at said first mentioned side of said plane, link means connected with said support and base adapted to transmit draft from said tractor to said base, and other link means connected with said support and base and cooperating with said first named link means to guide said base for translatory up and down movements relative to said tractor; said base and superstructure in collapsed position thereon being adapted to be straddled by said wheels to permit movement of said tractor from and into an attaching position over said support of said collapsed superstructure.

2. In an agricultural implement, the combination with a tractor having a body and transversely spaced ground engaging supports therefor, of an attachment comprising a base, a vertically collapsible superstructure mounted on said base including a support movable vertically relative to said base, means for detachably securing said support of said superstructure to said tractor body, said base and superstructure in collapsed position thereon being adapted to be straddled by said ground engaging supports to permit movement of said tractor from and into an attaching position over said support of said collapsed superstructure; and lift mechanism mounted on said support of said superstructure and operatively connected with said base.

3. In an agricultural implement, the combination with a tractor having a body and front and rear supports therefor including a pair of axially spaced wheels, of an attachment comprising a base, a vertically collapsible superstructure mounted on said base including a support detachably connected with said tractor intermediate said front and rear supports thereof; said base and superstructure in collapsed position thereon being adapted to be straddled by said wheels to permit movement of said tractor from and into an attaching position over said support of said collapsed superstructure; and means for vertically adjusting said base relative to said tractor including a lever rockably mounted on said support of said superstructure, and an arm detachably secured to said lever.

4. In an agricultural implement, the combination with a tractor having a body and front and rear supports therefor including a pair of axially spaced wheels, of an attachment comprising a base, a vertically collapsible superstructure mounted on said base including a pair of supports detachably secured, respectively, to opposite sides of said body; said base and superstructure in collapsed position thereon being adapted to be straddled by said wheels to permit movement of said tractor from and into an attaching position over said supports of said collapsed superstructure; and means for vertically adjusting said base relative to said tractor including a rock shaft journaled on said supports of said superstructure in position to extend below said tractor body intermediate said front and rear supports thereof, and mechanism operatively connecting said rock shaft with said base.

5. In an agricultural implement, the combination with a tractor having a body and front and rear supports therefor including a pair of axially spaced wheels, of an attachment comprising a base, a vertically collapsible superstructure mounted on said base including a pair of supports detachably secured, respectively, to opposite sides of said body; said base and superstructure in collapsed position thereon being adapted to be straddled by said wheels to permit movement of said tractor from and into an attaching position over said supports of said collapsed superstructure; a rock shaft journaled on said supports of said superstructure in position to extend below said tractor body intermediate said front and rear supports thereof, lifting connections between said rock shaft and said base for raising and lowering said base by rocking of said rock shaft, and actuating mechanism for said rock shaft mounted on said superstructure.

6. In an agricultural implement, the combination with a tractor having a body and front and rear supports therefor including a pair of axially spaced wheels, of an attachment comprising a base, a vertically collapsible superstructure mounted on said base including a pair of beams extending longitudinally of said tractor body at opposite sides thereof, means detachably securing said beams at their forward and rearward ends to said tractor body intermediate said front and rear supports thereof; said base and superstructure in collapsed position thereon being adapted to be straddled by said wheels to permit movement of said tractor from and into an attaching position over said beams of said collapsed superstructure; a rock shaft journaled on said beams in position to extend below said tractor body, lifting connections between said rock shaft and said base, an arm secured to said rock shaft, a lever rockably mounted on one of said beams, and a link connecting said lever with said arm for rocking said rock shaft by rocking movement of said lever.

7. In an agricultural implement, the combination with a tractor having a body and means including a pair of axially spaced rear wheels for sustaining said body, of an attachment comprising a pair of horizontally spaced beams having forward ends forwardly of a vertical plane through the axis of said rear wheels and extending rearwardly, below said axis, through the space between said rear wheels, forward cultivating tools mounted on said beams in position to cultivate the ground at opposite sides of a plant row between said beams, track eradicating tools mounted on said beams in position behind said rear wheels, a pair of links respectively connected with said beams and with said tractor adapted to transmit draft from said tractor to said beams, and another pair of links respectively connected with said beams and with said tractor and cooperating with said first named links to guide said beams for translatory up and down movements relative to said tractor.

8. In an agricultural implement, the combination with a tractor having a body and supporting means therefor including a rear axle structure and a pair of axially spaced rear wheels thereon, of an attachment comprising a pair of beams having rearward portions between said rear wheels below said axle structure, a rearward pair of links having lower pivot connections, respectively, with said beams between said rear wheels for swinging movement in vertical planes longitudinally of said tractor, a forward pair of links having lower pivot connections, respectively, with said beams forwardly of said lower pivot connections of said rearward pair of links, means secured to said tractor body and cooperating with said forward and rearward pairs of links to provide stationary upper pivotal supports for said rearward pair of links adjacent to said rear axle structure and stationary upper pivotal supports for said forward pair of links forwardly of said upper pivotal supports for said rearward pair of links; and lift mechanism sustained on said tractor and operatively connected with said beams.

9. In an agricultural implement, the combination with a tractor having a body and supporting means therefor including a rear axle structure and a pair of axially spaced rear wheels thereon, of an attachment comprising a pair of beams having rearward portions between said rear wheels below said axle structure, a rearward pair of links having lower pivot connections, respectively, with said beams between said rear wheels for swinging movement in vertical planes longitudinally of said tractor, a forward pair of links having lower pivot connections, respectively, with said beams forwardly of said lower pivot connections of said rearward pair of links, means secured to said tractor body and cooperating with said forward and rearward pairs of links to provide stationary upper pivotal supports for said rearward pair of links adjacent to said rear axle structure and stationary upper pivotal supports for said forward pair of links forwardly of said upper pivotal supports for said rearward pair of links; and lift mechanism for said beams including a rock shaft mounted on said tractor body, a pair of arms secured to said rock shaft, and links respectively connecting said arms with said beams.

10. In an agricultural implement, the combination with a tractor of an attachment comprising a pair of upper beams extending longitudinally of said tractor at opposite sides thereof and each having a pair of longitudinally spaced brackets secured thereto, means cooperating with said brackets to secure said beams to forward and rearward portions, respectively, of said tractor, a link pivotally mounted in each of said brackets, a pair of lower beams respectively connected with said pairs of brackets by said links for vertical movement substantially parallel to the ground, and lift mechanism for said lower beams including an actuating element mounted on one of said upper beams and operatively connected with said lower beams.

11. An implement attachment for tractors, comprising relatively opposed supports and relatively opposed link elements jointed together to form a vertically collapsible parallelogram structure, one of said supports, forming an upper side member of said parallelogram structure, being adapted to be secured to the tractor, and the other of said supports, forming a lower side member of said parallelogram structure, being adapted to carry ground engaging tools; and control mechanism for said parallelogram structure including a push connection between said upper and lower side members, whereby said upper side member may be raised relative to said lower side member by actuation of said control mechanism while said lower side member rests on the ground.

12. An implement attachment for tractors, comprising relatively opposed supports and relatively opposed link elements jointed together to form a vertically collapsible parallelogram structure, one of said supports, forming an upper side member of said parallelogram structure, being adapted to be secured to the tractor, and the other of said supports, forming a lower side member of said parallelogram structure, being adapted to carry ground engaging tools; and control mechanism for said parallelogram structure comprising an arm rockably mounted on said upper side member, a rod pivotally connected at one end with said arm and connected at the other end with said lower side member for transmitting upward pull and downward push thereto, and means connected with said arm for transmitting rocking movement thereto.

13. In a tractor propelled implement, the combination of a tractor and an attachment therefor, comprising a pair of horizontally spaced L-shaped beams arranged to extend with their longer legs through the space between axially spaced wheels of said tractor and with their shorter legs across the tracks of said wheels, parallel lift mechanism connecting said beams with said tractor, track eradicating tools behind said tractor wheels, mounting means for said track eradicating tools connected, respectively, with said shorter legs of said beams at one side of a vertical plane through the axis of said wheels, for adjustment longitudinally thereof, ground engaging tools at the outer side of said plane positioned to travel at opposite sides of a plant row extending between said beams, and mounting means for said ground engaging tools connected, respectively, with said longer legs of said beams for adjustment transversely thereof parallel to said shorter legs.

14. In an agricultural implement, the combination with a tractor having a body and supporting means therefor including an axle structure and a pair of axially spaced wheels thereon, of an implement attachment comprising a base extending through the space between said wheels below said axle structure and having front and rear ends forwardly and rearwardly, respectively, of a vertical plane through the axis of said wheels, forward and rearward pivot means on said base relatively spaced longitudinally thereof to locate said forward pivot means closer to said front end than to said rear end of said base and said rearward pivot means closer to said rear end than to said front end of said base, forward and rearward links having lower ends respectively pivoted in said forward and rearward pivot means on said base, forward and rearward pivot means on said tractor respectively connecting upper ends of said forward and rearward links with said tractor, and means for slightly varying the length of the combined distances from one pivot axis of one of said links to the other pivot axis thereof and from there to the adjacent pivot axis of the other of said links.

15. In an agricultural implement, the combination with a tractor having a body and supporting means therefor including an axle structure and a pair of axially spaced wheels thereon, of an implement attachment comprising a base extending through the space between said wheels below said axle structure and having front and rear ends forwardly and rearwardly, respectively, of a vertical plane through the axis of said wheels, forward and rearward pivot means on said base relatively spaced longitudinally thereof to locate said forward pivot means closer to said front end than to said rear end of said base and said rearward pivot means closer to said rear end than to said front end of said base, forward and rearward links having lower ends respectively pivoted in said forward and rearward pivot means on said base, and forward and rearward pivot means on said tractor respectively connecting upper ends of said forward and rearward links with said tractor, one of said pivot means being adjustable to slightly vary the length of the combined distances from one pivot axis of one of said links to the other pivot axis thereof and from there to the adjacent pivot axis of the other of said links.

16. In an agricultural implement, the combination with a tractor having a body and supporting means therefor including an axle structure and a pair of axially spaced wheels thereon, of an implement attachment comprising a base extending through the space between said wheels below said axle structure and having front and rear ends forwardly and rearwardly, respectively, of a vertical plane through the axis of said wheels, forward and rearward pivot means on said base relatively spaced longitudinally thereof to locate said forward pivot means closer to said front end than to said rear end of said base and said rearward pivot means closer to said rear end than to said front end of said base, forward and rearward links having lower ends respectively pivoted in said forward and rearward pivot means on said base, and forward and rearward pivot means on said tractor respectively connecting upper ends of said forward and rearward links with said tractor, one of said pivot means on said base being adjustable longitudinally of said base to slightly tilt said base about the axis of the other pivot means on said base.

17. In an agricultural implement, the combination with a tractor having a body and supporting means therefor including a rear axle structure and a pair of axially spaced rear wheels thereon, of an implement attachment comprising a beam extending through the space between said rear wheels below said axle structure, cultivating tools mounted on said beam in advance of said rear axle structure, a track eradicating tool mounted on said beam in position behind one of said rear wheels, a rearward link having a lower end secured to said beam for pivotal movement about an axis closer to the rear end than to the front end of said beam, rearward pivot means connecting said rearward link with said tractor in proximity to said rear axle structure, a bracket mounted on a forward portion of said beam for adjustment longitudinally thereof, a forward link of an effective length equal to the effective length of said rearward link, pivotally mounted at its lower end on said bracket, and forward pivot means connecting the upper end of said forward link with said tractor body at a portion thereof substantially in advance of said rear axle structure.

18. In an agricultural implement, the combination with a tractor having a body and means including a pair of axially spaced rear wheels for sustaining said body, of an attachment comprising a pair of horizontally spaced beams having forward ends forwardly of a vertical plane through the axis of said rear wheels and extending rearwardly, below said axis, through the space between said rear wheels, forward cultivating tools mounted on said beams in position to cultivate the ground at opposite sides of a plant row between said beams, track eradicating tools mounted on said beams in position behind said rear wheels, a pair of links respectively connected with said beams and with said tractor adapted to transmit draft from said tractor to said beams, and another pair of links respectively connected with said beams and with said tractor and cooperating with said first named links to guide said beams for translatory up and down movements relative to said tractor, two of said links having relatively long journal connections with said beams respectively and with said tractor, whereby said beams are restrained from transverse tilting and lateral displacement relative to said tractor.

19. In an agricultural implement, the combination with a tractor having a body and means including a pair of axially spaced rear wheels for sustaining said body, of an attachment comprising a pair of horizontally spaced beams having forward ends forwardly of a vertical plane through the axis of said rear wheels and extending rearwardly, below said axis, through the space between said rear wheels, forward cultivating tools mounted on said beams in position to cultivate the ground at opposite sides of a plant row between said beams, track eradicating tools mounted on said beams in position behind said rear wheels, an upwardly arched connecting member secured to said beams rearwardly of said plane, a pair of draft transmitting links, forwardly of said plane, having relatively long journal connections with said beams, respectively, and with said tractor, whereby said beams are restrained from transverse tilting and lateral displacement relative to said tractor, and another pair of links respectively connected with said beams and with said tractor and cooperating with said first pair of links to guide said beams for translatory up and down movements relative to said tractor.

CONRAD E. FRUDDEN.
WILLARD H. TANKE.
AUGUST G. BUHR.